Aug. 31, 1937.   G. JOHNSON   2,091,859
MEANS FOR ATTACHING MOLDINGS AND THE LIKE TO CHANNEL SHAPED SUPPORTS
Filed March 20, 1935
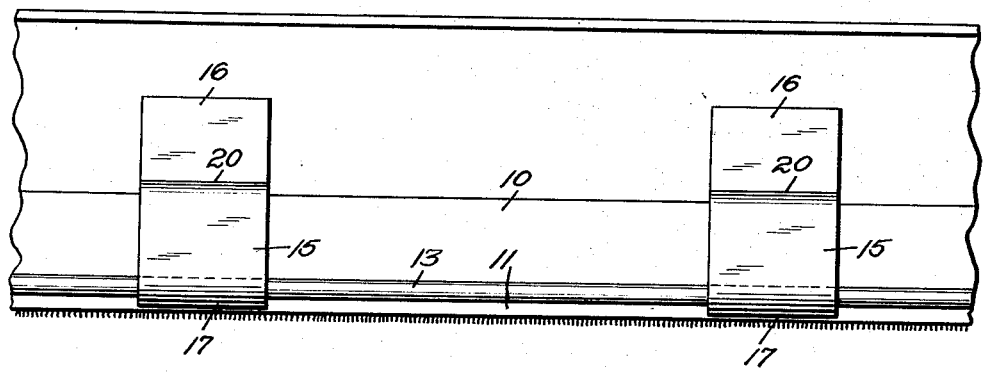
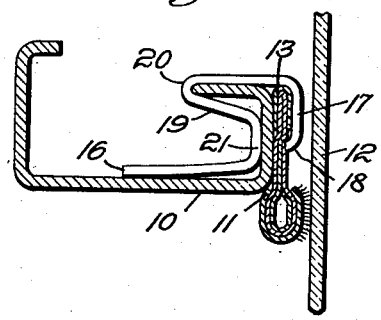  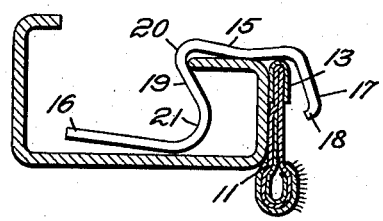
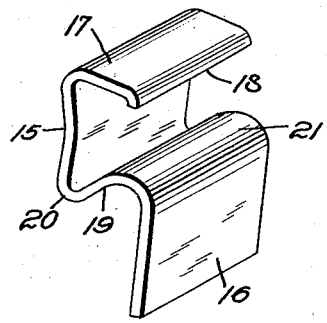
Inventor:
Gustav Johnson.
by Walter S. Jones
Atty Patented Aug. 31, 1937

2,091,859

UNITED STATES PATENT OFFICE 2,091,859

MEANS FOR ATTACHING MOLDINGS AND THE LIKE TO CHANNEL-SHAPED SUPPORTS

Gustav Johnson, West Roxbury, Mass., assignor to United-Carr Fastener Corporation, Cambridge, Mass., a corporation of Massachusetts Application March 20, 1935, Serial No. 12,113

3 Claims. (Cl. 189—35)

The present invention relates to means for attaching a molding or the like to channel-shaped metal supports, and the invention aims generally to improve and simplify the assembled structure and also to provide an improved fastening for that purpose.

More particularly, the invention relates to improvements in metal structures trimmed with a molding or the like, as for example, the frame of a motor vehicle surrounding the windows, wherein it has been desirable to trim the frame with a flexible molding providing a channel for the window pane to seal the opening against entrance of wind and weather, although it is to be understood that the invention is not restricted to the specific use.

The invention is conventionally illustrated as applied to molding, such as the glass rim channel for the window frame of a motor vehicle body.

In the accompanying drawing

Fig. 1 is a plan view of a portion of a supporting frame and window molding, secured in assembled relation according to the invention;

Fig. 2 is a vertical sectional view thereof;

Fig. 3 is a vertical sectional view illustrating the relative position of the parts, just prior to clamping the molding to the supporting frame; and Fig. 4 is a perspective view of the clip.

Referring to the illustrated embodiment of the invention shown in the drawing, the window frames of a motor vehicle body are preferably formed as a metal channel shaped member as at 10, and may be formed as a separate frame member or as an integral part of the body. It is customary to attach a molding 11 to the channel 10 preferably to provide a channel for the glass window pane 12, and this molding may be of any desired construction suitable for its purpose.

Heretofore this molding has been attached to the channel support by first drilling holes in the channel and molding, where the latter is provided with a metal binding as at 13, and then securing the molding in place by screws, bolts or like fastenings.

According to the present invention, the necessity of drilling holes in the support 10 and/or the binding 13 of the molding is eliminated and the molding may be quickly and securely clipped to the support by means of clips, for example, as shown in Fig. 4.

The clip according to the invention may be formed of a strip of metal, preferably having a substantial width, and advantageously is shaped to provide a spaced head portion 15 and foot portion 16. The head portion 15 is provided at its extremity with an angularly bent clamping portion 17 formed with an inturned clamping edge 18 for gripping the molding. The head 15 and foot 16 are connected by an S-shaped portion 19, the connection with the head 15 being such as to snugly fit the upper flange of the channel 10, as at 20, and the connection between the portion 19 and the foot 16 being such as to engage the inner face of the vertical side of the channel as at 21, Fig. 2.

The clip may be initially formed as shown in Fig. 3 and when it is desired to secure a molding, such as the glass rim channel 11 to the channel shaped frame, the clip is first applied so that the head portion 15 rests upon the upper flange of the channel and the S-shaped portion 19 lies within the channel. By means of a special tool, not shown, contacting pressure may be applied to the S-shaped portion 19 and the clamping portion 17 to force the clamping edge 18 into engagement with the molding 11, and to bring the portion 21 into engagement with the inner vertical face of the channel 10. In this position, see Fig. 2, the head portion rests upon the upper flange of the channel and the foot portion 16 engages the lower flange of the channel.

It will be apparent that any tendency of the molding 11 to be displaced from the face of the channel 10 must be accompanied by a movement of the clamping portion 17 outwardly, and this is prevented by the strength and stiffness of the metal. Any tendency of the clip, as a whole, to pivot about the inner edge of the upper flange of the channel, as at 20, is resisted by the engagement between the foot portion 16 and the lower flange of the channel.

It will be apparent that the invention is not restricted solely to securing glass run channels to the supporting frame of motor vehicle bodies. On the contrary, the invention contemplates the novel means of securing moldings and strip generally to flanged supports.

Having illustrated and described one embodiment of my invention, I claim as new:

1. An article of manufacture in the form of a clip formed from sheet metal many times wider than its thickness as distinguished from wire, said clip having a head portion 15, a substantially U-shaped portion connected to one end of said head portion 15 and including a foot portion 16 substantially parallel to said head portion 15 and spaced therefrom and a clamping portion 17 extending from the other end of the said head portion 15, and said U-shaped portion and clamping portion being adapted to be moved one toward the other for clamping suitable parts between them.

2. An article of manufacture in the form of a clip formed from sheet metal many times wider than its thickness as distinguished from wire, said clip having a head portion 15, a substantially U-shaped portion connected to one end of said head portion 15 and including a foot portion 16 substantially parallel to said head portion 15 and spaced therefrom and a clamping portion 17 extending from the other end of the said head portion 15 with a clamping edge 18 bent toward said U-shaped portion, and said U-shaped portion and clamping portion being adapted to be moved one toward the other for clamping suitable parts between them.

3. The combination with a channel member having a U-shaped portion, of a flexible strip resting against the outer face of the bottom of said U-shaped portion and a metal clip holding the flexible strip in position, said clip having a head portion 15 engaging the outer surface of one leg of said U-shaped portion, a clamping portion 17 extending from one end of said head portion 15 at substantially a right angle and overlying a portion of said flexible strip and a substantially U-shaped portion connected to the other end of said head portion 15 and fitting within the U-shaped portion of said channel member, said U-shaped portion of the clip holding the clamping portion 17 tightly against said flexible strip and having a foot portion 16 engaging the inner surface of the other leg of the U of the channel to prevent the clip from accidentally tipping off the channel member.

GUSTAV JOHNSON.